US008533068B2

(12) United States Patent
Berger et al.

(10) Patent No.: US 8,533,068 B2
(45) Date of Patent: Sep. 10, 2013

(54) DISTRIBUTING PRODUCTS FROM SUPPLIERS TO CONSUMERS IN A NETWORK ENVIRONMENT

(75) Inventors: Richard W. Berger, Morro Bay, CA (US); Brant W. Berger, Morro Bay, CA (US); John L. Funk, Salt Lake City, UT (US)

(73) Assignees: Richard W. Berger, Paso Robles, CA (US); Brant W. Berger, Morrow Bay, CA (US)

( * ) Notice: Subject to any disclaimer, the term of this patent is extended or adjusted under 35 U.S.C. 154(b) by 74 days.

(21) Appl. No.: 13/008,766

(22) Filed: Jan. 18, 2011

(65) Prior Publication Data
US 2011/0112929 A1   May 12, 2011

Related U.S. Application Data

(60) Division of application No. 10/665,841, filed on Sep. 19, 2003, now Pat. No. 7,885,856, which is a continuation-in-part of application No. 09/388,999, filed on Sep. 1, 1999, now abandoned.

(51) Int. Cl.
*G06Q 30/00* (2012.01)
*G06Q 30/06* (2012.01)
*G06Q 30/02* (2012.01)

(52) U.S. Cl.
CPC .............. *G06Q 30/06* (2013.01); *G06Q 30/02* (2013.01)
USPC ...................................... 705/26.8

(58) Field of Classification Search
USPC ............................... 705/26.1, 26.8
See application file for complete search history.

(56) References Cited

U.S. PATENT DOCUMENTS

| 4,799,156 A | 1/1989 | Shavit et al. |
| 5,319,542 A | 6/1994 | King, Jr. et al. |

(Continued)

FOREIGN PATENT DOCUMENTS

| EP | 0 697 669 | 2/1996 |
| JP | 10-340422 | 12/1998 |

(Continued)

OTHER PUBLICATIONS

Unknown Author, "OurHouse.com Enhances Fulfillment System Via Alliance With USgift.com," PR Newswire, Sep. 6, 2000.*

(Continued)

*Primary Examiner* — Amee A Shah
(74) *Attorney, Agent, or Firm* — Weaver Austin Villeneuve & Sampson LLP

(57) ABSTRACT

Systems and methods enabling suppliers to control the distribution of products to consumers in a network environment while accommodating the concerns of its brick and mortar distribution channels are described. Consumer orders for products are received, and consumer product orders are routed in accordance with fulfillment policies respectively selected by the supplier(s). The system includes a graphical consumer interface configured to receive consumer orders for products, and an order flow controller configured to route consumer product orders in accordance with fulfillment policies respectively selected by the supplier(s). The system also includes a graphical consumer interface that is accessible over the Internet and is configured to display price and availability information for the products of each of the suppliers organized by product category and is configured to receive consumer orders for products. A consumer may search through displayable product information within a given category by supplier, by product type, by product feature, or by a combination of two or more of these identifiers using a search engine.

7 Claims, 4 Drawing Sheets

(56) References Cited

U.S. PATENT DOCUMENTS

| | | | |
|---|---|---|---|
| 5,710,887 A | 1/1998 | Chelliah et al. | |
| 5,742,931 A | 4/1998 | Spiegelhoff et al. | |
| 5,794,207 A | 8/1998 | Walker et al. | |
| 5,852,809 A | 12/1998 | Abel et al. | |
| 5,870,717 A | 2/1999 | Wiecha | |
| 5,890,138 A | 3/1999 | Godin et al. | |
| 5,890,175 A | 3/1999 | Wong et al. | |
| 5,895,454 A | 4/1999 | Harrington | |
| 5,897,622 A | 4/1999 | Blinn et al. | |
| 5,926,798 A | 7/1999 | Carter | |
| 5,940,807 A | 8/1999 | Purcell | |
| 5,970,472 A | 10/1999 | Allsop et al. | |
| 5,970,475 A | 10/1999 | Barnes et al. | |
| 5,974,395 A | 10/1999 | Bellini et al. | |
| 6,029,141 A | 2/2000 | Bezos et al. | |
| 6,032,130 A | 2/2000 | Alloul et al. | |
| 6,055,516 A | 4/2000 | Johnson et al. | |
| 6,061,057 A | 5/2000 | Knowlton et al. | |
| 6,085,176 A | 7/2000 | Woolston | |
| 6,125,352 A * | 9/2000 | Franklin et al. | 705/26.8 |
| 6,125,353 A | 9/2000 | Yagasaki | |
| 6,125,391 A | 9/2000 | Meltzer et al. | |
| 6,131,087 A | 10/2000 | Luke et al. | |
| 6,151,024 A | 11/2000 | Alimpich et al. | |
| 6,167,378 A * | 12/2000 | Webber, Jr. | 705/7.25 |
| 2002/0077929 A1 * | 6/2002 | Knorr et al. | 705/26 |
| 2004/0030611 A1 * | 2/2004 | Byrne | 705/26 |

FOREIGN PATENT DOCUMENTS

| | | |
|---|---|---|
| WO | WO96/34356 | 10/1996 |
| WO | WO98/08177 | 2/1998 |
| WO | WO98/34167 | 8/1998 |
| WO | WO 9834167 A2 * | 8/1998 |
| WO | WO99/66427 | 12/1999 |
| WO | WO00/23929 | 4/2000 |

OTHER PUBLICATIONS

Reidy, Chris "Connecting the dots behind that "buy button" on-line Retailers Are Buzzing to Coordinatelogistics", Boston Globe, Oct. 1999, Worcester, Massachusetts.

Levitan, L.C. "Global Sports, Inc., A Leading Example of e-Tail/Retail Convergence; Initiating Coverage of Company Positioned for Leadership in Sporting Goods eTailing with a Buy Rating", BancBoston Robertson Stephens, 21 pp., Aug. 1999.

Davis, Fredric E. "Windows 95: The Internet's Built in Microsoft's Internet—Savvy Operating System Will Make On-line Exploration a Snap Netguide," Oct. 1995, No. 210, p. 72.

Jacso, P. "Shopping Robots for Electronic Commerce." Online Jul. 1998, vol. 22, No. 2, p. 14.

PCT Search Report dated Dec. 27, 2000 issued in Appl. No. PCT/US00/24212 filed Sep. 1, 2000.

* cited by examiner

DISTRIBUTING PRODUCTS FROM SUPPLIERS TO CONSUMERS IN A NETWORK ENVIRONMENT

CROSS-REFERENCE TO RELATED APPLICATION

This application is a divisional application of U.S. patent application Ser. No. 10/665,841, filed Sep. 19, 2003, which is a continuation-in-part of and claims priority of U.S. patent application Ser. No. 09/388,999, filed Sep. 1, 1999, both of which are incorporated herein by reference in their entirety for all purposes.

BACKGROUND OF THE INVENTION

This invention relates to systems and methods of distributing products from suppliers to consumers.

Suppliers (e.g., manufacturers, distributors, and venders) have one or more channels by which to distribute products (i.e., goods and services) to consumers. A supplier's distribution channel often will include one or more retailers, each of which typically specializes in selling a particular class of products to consumers. For example, some retailers specialize in selling only high end, high margin products, whereas other retailers specialize in selling low end (or medium end) products. Some suppliers distribute some or all of their products to consumers directly, without involving retailers.

Recently, there has been a trend toward distributing products to consumers over a computer network (e.g., the Internet). For example, some retailers and some suppliers have developed systems for displaying products to consumers and receiving consumer purchase requests over the Internet. Systems designed to coordinate the sales of products offered by a plurality of retailers to create a "virtual mall" have been proposed. On-line sales of products enable such products to be sold at lower prices as a result of the inherent efficiencies provided by on-line sales systems.

When a particular retailer elects to offer its products on-line, the existing distribution system of a supplier of that retailer may be disrupted. Typically only large volume low end (and possibly medium end) retailers have the resources and the consumer recognition to successfully offer products on-line; high end specialty retailers generally cannot launch a successful on-line sales program. Thus, in order for suppliers to sell their high end (and possibly medium end) products on-line, manufacturers have two conventional choices: the suppliers must distribute these products on-line themselves, or the suppliers must provide these products to the low end (and possibly medium end) retailers that have successfully launched on-line sales programs. Either of these approaches, however, is likely to significantly reduce the sales volumes of the high end retailers. Under these circumstances, such suppliers may lose one or more of its high end, "brick and mortar" distribution channels because high end retailers may elect to not carry the high end products of suppliers whose local sales they do not exclusively control.

SUMMARY OF THE INVENTION

The invention provides systems and methods enabling suppliers to control the distribution of products to consumers in a network environment while accommodating the concerns of its brick and mortar distribution channels.

In one aspect, the invention features a system and method for coordinating the distribution of products from a single supplier or a plurality of product suppliers to consumers in a network environment. In accordance with this inventive approach, consumer orders for products are received, and consumer product orders are routed in accordance with fulfillment policies (i.e., fulfillment channels) respectively selected by the suppliers. The system comprises: a graphical consumer interface configured to receive consumer orders for products; and an order flow controller configured to route consumer product orders in accordance with fulfillment policies respectively selected by the suppliers.

In another aspect, the invention features a network-based system for coordinating the distribution of products to consumers from a single supplier or a plurality of suppliers of products in a plurality of different product categories, comprising: a graphical consumer interface accessible over the Internet and configured to display price and availability information for the products of each of the suppliers organized by product category and to receive consumer orders for products; and a search engine configured to enable a consumer to search through displayable product information within a given category by supplier, by product type, by product feature, or by a combination of two or more of these identifiers.

Embodiments may include one or more of the following features.

The order flow controller may be configured to route consumer orders for one or more products of a given supplier to that supplier in accordance with that supplier's selected fulfillment policy. The order flow controller may be configured to route consumer orders for one or more products of a given supplier to one or more retailers identified by that supplier in accordance with that supplier's selected fulfillment policy. Also, the order flow controller may be configured to not accept consumer orders for one or more products of a given supplier in accordance with that supplier's selected fulfillment policy. The order flow controller may be configured to route consumer orders for one or more products of a given supplier to a product order list accessible by one or more retailers identified by that supplier in accordance with that supplier's selected fulfillment policy.

The system may include a back room manager configured to remove product orders from the product order list upon receipt of a fulfillment acceptance indication from a retailer. The back room manager may be configured to enable the given supplier to fulfill selected product orders identified on the product order list. The back room manager may be configured to enable the given supplier to fulfill selected product orders identified on the product order list only after a preselected period of time has passed since the product order was received.

The consumer interface preferably is configured to display price and availability information for the products of each of the suppliers organized by product category. The system may include a search engine configured to enable a consumer to search through the products of a given category by supplier, by product type, by product feature, or by a combination of two or more of these identifiers.

The consumer interface may be configured to enable a consumer to display selected product representations in a separate scratch pad window. The consumer interface may be configured to enable a consumer to remove product representations from the scratch pad window. The consumer interface may be configured to enable a consumer to drag a selected product representation from a product previews window to the scratch pad window. The consumer interface may be configured to enable a consumer to initiate a product order from the scratch pad window or from the product preview window, or from both windows.

The system may include a price filter configured to transmit product price information and product availability information to the consumer interface. The price filter may be configured to transmit supplier specified product prices. The price filter may be configured to transmit retailer specified product prices during certain supplier selected periods of time. The price filter may be configured to transmit only a selected number of the lowest retailer specified product prices.

The system also may include an escrow account manager configured to retain consumer payments for a selected period of time and to distribute retained funds. The escrow account manager may be configured to distribute retained funds to an entity that shipped a product to a consumer. The escrow account manager may be configured to distribute funds retained for a given product order to a supplier that fulfilled the given product order, one or more retailers identified by that supplier, or to a combination of supplier and one or more retailers.

In another aspect, the invention features a method for coordinating the distribution of products from a single or a plurality of product suppliers to consumers in a network environment, comprising: posting a product order on an order fulfillment page after receiving a product order from a consumer; transmitting product order information to a retailer after receiving a fulfillment acceptance indication from the retailer; and purging the product order from the order fulfillment page after receiving a fulfillment acceptance indication from the retailer.

After a selected period of time after the product order was received, product information may be to a supplier and the product order may be purged from the order fulfillment page.

As used herein, the term "supplier" refers to any entity (e.g., manufacturers, distributors and vendors) that has at least one distribution channel that involves a retail establishment.

As used herein, a "retailer" is a brick and mortar entity used by a supplier to fulfill product orders. A participating retailer according to the invention is not directly accessible by a consumer on the graphical consumer interface over the Internet.

Also, as used herein, the term "product" refers to both goods and services.

Among the advantages of the invention are the following.

The invention provides a way for suppliers to control the distribution of its products in a network environment while maintaining its traditional brick and mortar distribution channels. For example, the invention allows suppliers to offer its high end products without cutting out the high end retailers. Furthermore, the invention provides a uniform way for consumers to navigate and order products from multiple, related and unrelated industries.

Other features and advantages will become apparent from the following description, including the drawings and the claims.

DETAILED DESCRIPTION

Figure 1:
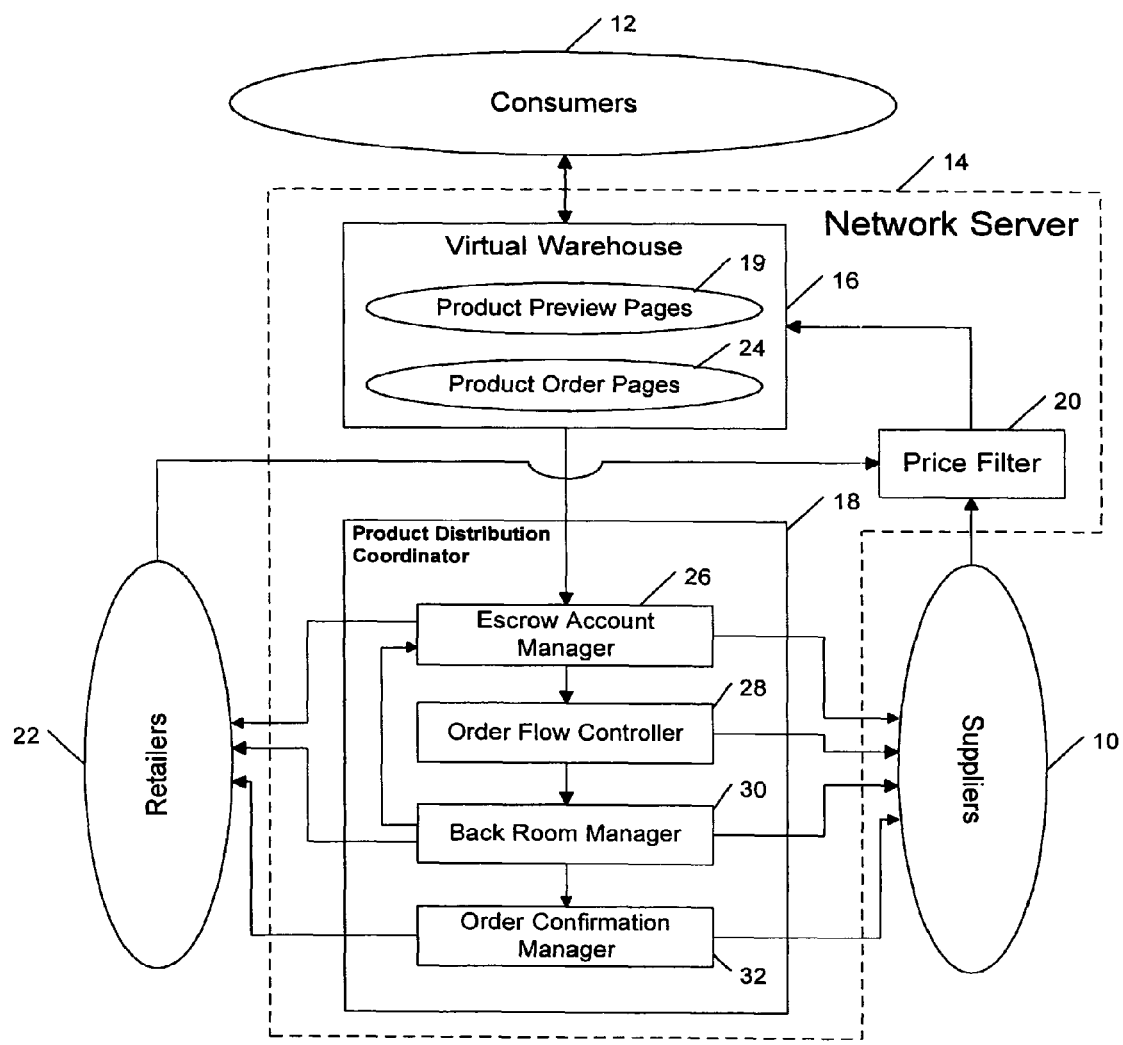
FIG. 1 is a block diagram of a system for coordinating the distribution of products from a plurality of suppliers to consumers in a network environment.

Referring to FIG. 1, a network-based system for coordinating the distribution of products from a single supplier or a plurality of suppliers 10 to a plurality of consumers 12 includes a network server 14 that is operable to implement a virtual warehouse 16 and a product distribution coordinator 18. Virtual warehouse 16 is accessible by consumers 12 over a network (e.g., the Internet) and includes a graphical consumer interface that is configured to present to consumers a plurality of product preview pages 19 each displaying information (e.g., price and availability) relating to a plurality of products. A price filter 20 populates product preview pages 19 with price information supplied by suppliers 10 and participating retailers 22. Consumers may order one or more of the products displayed on product preview pages 19 by entering order request data into one or more product order pages 24. Product distribution coordinator 18 is configured to process consumer product orders and to coordinate the fulfillment of product orders in accordance with fulfillment policies selected by suppliers 10.

Product distribution coordinator 18 includes an escrow account manager 26, an order flow controller 28, a back room manager 30, and an order confirmation manager 32. Escrow account manager extracts consumer payment information (e.g., consumer name, product description, product price, credit card number, expiration date) from product order pages 24. Escrow account manager 26 debits the consumers' credit card accounts and holds the funds in escrow until the expiration of a preselected period of time (e.g., 30 days), at which point funds are disbursed to the appropriate entities. Order flow controller 28 extracts product order information (e.g., product description, product price) from product order pages 24 and routes the extracted product order information in accordance with supplier selected fulfillment policies, as explained in detail below. Back room manager 30 coordinates the fulfillment of product orders by retailers 22 and suppliers 10. Order confirmation manager 32 coordinates the transmission of shipment confirmation information to suppliers 10 and consumers 12.

Virtual warehouse 16, product distribution coordinator 18 and price filter 20 may be implemented in computer software using conventional computer programming techniques.

Figure 2:
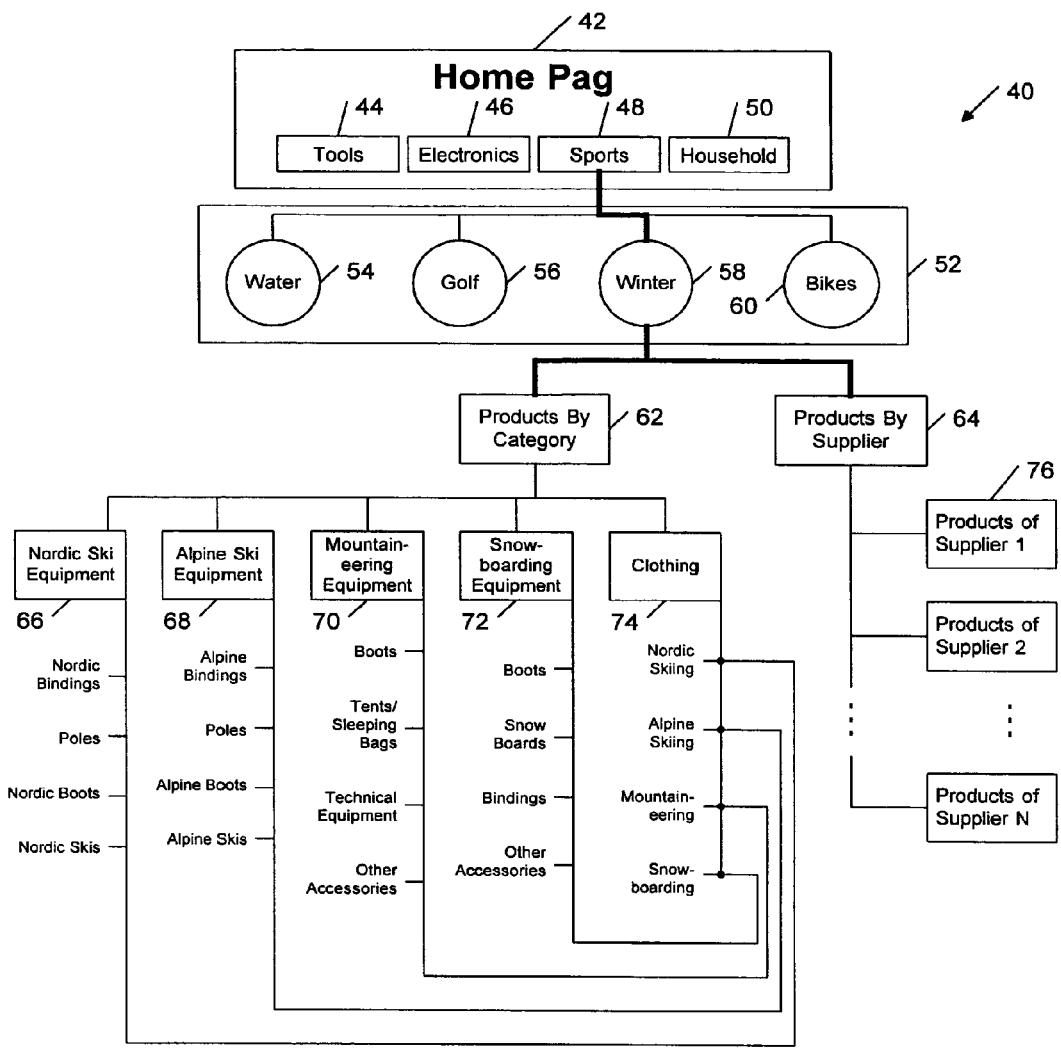
FIG. 2 is a block diagram of a data structure for providing product information to consumers.

As shown in FIG. 2, virtual warehouse 16 organizes product preview pages 19 in a data structure 40. At the root of data structure 40 is a home page 42 which is the page that is presented to consumers 12 when they first access the system. Home page 42 includes a general description of the system (including how information is organized and how to navigate through the system), and includes icons 44, 46, 48, 50 corresponding to different product categories (e.g., tools, electronics, sports, and household items). Each of the icons 44-50 represents a hyperlink to a page that includes icons corresponding to different product sub-categories. For example, sports icon 48 includes a hyperlink to a sports page 52 that includes icons 54, 56, 58 and 60 which correspond to the sports sub-categories of water sports, golf, winter sports and bikes, respectively. Each of the sub-category icons 54-60 includes hyperlinks to pages that list products by category or by supplier. For example, winter sports icon 58 includes hyperlinks to pages 62 and 64 which enable consumers to preview products by category and by supplier name, respectively. The products by category pages include links to pages containing lists of products corresponding to particular product types. For example, the winter sports products by category page 62 includes links to pages 66, 68, 70, 72 and 74 listing products corresponding to the following product types: Nordic ski equipment, alpine ski equipment, mountaineering equipment, snowboarding equipment and clothing. Product listing pages may include links to other product listing pages, as shown in FIG. 2. The products by supplier pages include links to pages containing lists of the products of particular suppliers.

Virtual warehouse 16 may include a search engine that enables consumers to search for products by manufacturer, by product type, by product feature (e.g., product color), or by a combination of two or more of these categories.

Figure 3:
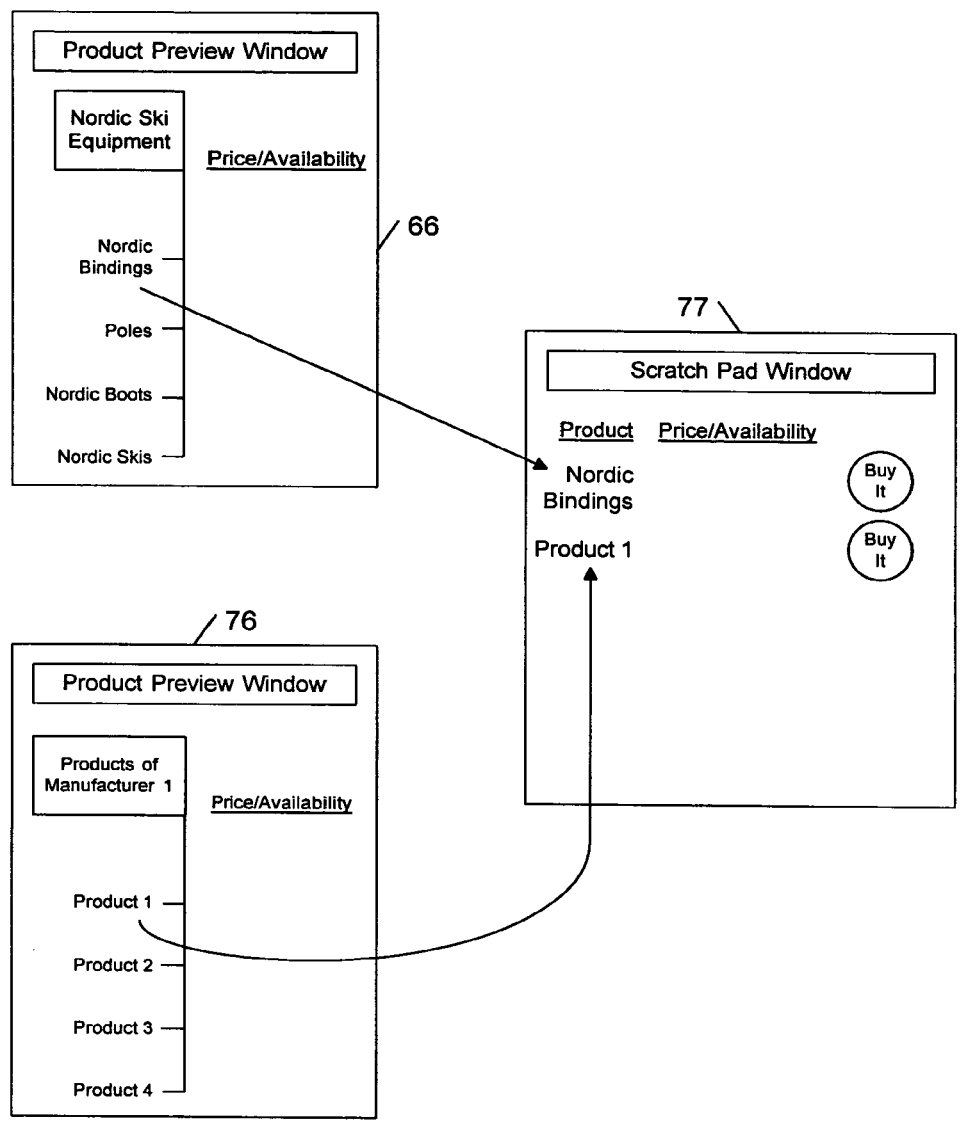
FIG. 3 is a block diagram of a graphical consumer interface enabling a consumer to selectively display one or more products being considered for purchase.

Referring to FIG. 3, product preview windows 66 and 76 display product information (e.g., price and availability) by product sub-category and by manufacturer, respectively. In one embodiment, virtual warehouse 16 includes a graphical consumer interface that is configured to enable a consumer to display selected product representations (e.g., Nordic bindings and product 1) in a separate scratch pad window 77. A consumer may add additional product representations to scratch pad window 77 by "dragging" product representations from a product preview window into scratch pad window 77, or may remove one or more of product representations from scratch pad window 77 by dragging the product representations outside of scratch pad window 77. A consumer may purchase one or more of the products identified in scratch pad window 77 by selecting the corresponding "Buy It" icon 78, 79. The selection of a Buy It icon causes the corresponding product to be added to a purchase list. After the consumer has finished shopping, the consumer may select a "Check Out" icon that triggers the opening of a product order page 24, which solicits payment information from the consumer.

Other embodiments may use different "shopping cart" systems to enable consumers to select items that they are considering to purchase.

As explained above, price filter 20 posts prices on product preview pages 19. In one embodiment, during an "in season" shopping period suppliers provide the price information that is posted on product preview pages 19. During an off-price, sale season shopping period suppliers 10 and retailers 22 transmit their lowest prices and available quantities to price filter 20, and price filter 20 posts on product preview pages 19 a limited number (e.g., three) of the lowest prices received for the products which are on sale.

Product distribution coordinator 18 enables suppliers to control the way in which consumers' product orders are fulfilled. For example, a supplier may elect merely to have its products listed on product preview pages with suggested retail prices and indications that the products are not available through the system. Alternatively, a supplier may elect to fulfill all orders for its products; in which case, order flow controller 28 routes all consumer product orders to that supplier. A supplier may identify particular retailers that are able to fulfill orders for particular kinds of products. Also, a supplier may identify the product orders that it will ship, and the product orders that certain retailers may fulfill As explained in detail below in connection with FIG. 4, a supplier may elect to allow one or more retailers to have the opportunity to ship one or more of the supplier's products; in which case, order flow controller 28 routes consumer orders for these products to back room manager 30. Back room manager posts consumer product orders as a product order list on a password-protected order fulfillment page which participating retailers 22 may access over the Internet. A retailer may customize its view of the order fulfillment page to display only the products sold by that retailer. When a particular retailer elects to fulfill a posted order, back room manager 30 removes the product order from the product order list and transmits the information needed to fulfill the order to the shipping retailer. When an order is ready to ship, the shipper (manufacturer or retailer) transmits to back room manager 30 the item being shipped, the price, the shipping cost, other shipping details, the consumer's name, address and escrow number. Back room manager 30 transmits to the consumer a message confirming the shipment of the ordered product. Back room manager 30 also transmits a confirmation message to the shipper and transmits notification to escrow account manager 26, initiating the escrow period for that transaction. Suppliers may elect to ship product orders that have not been picked up by participating retailers within a preselected period of time (e.g., 24 hours). Also, suppliers may access the order fulfillment page to monitor the fulfillment status of orders for its products.

Figure 4:
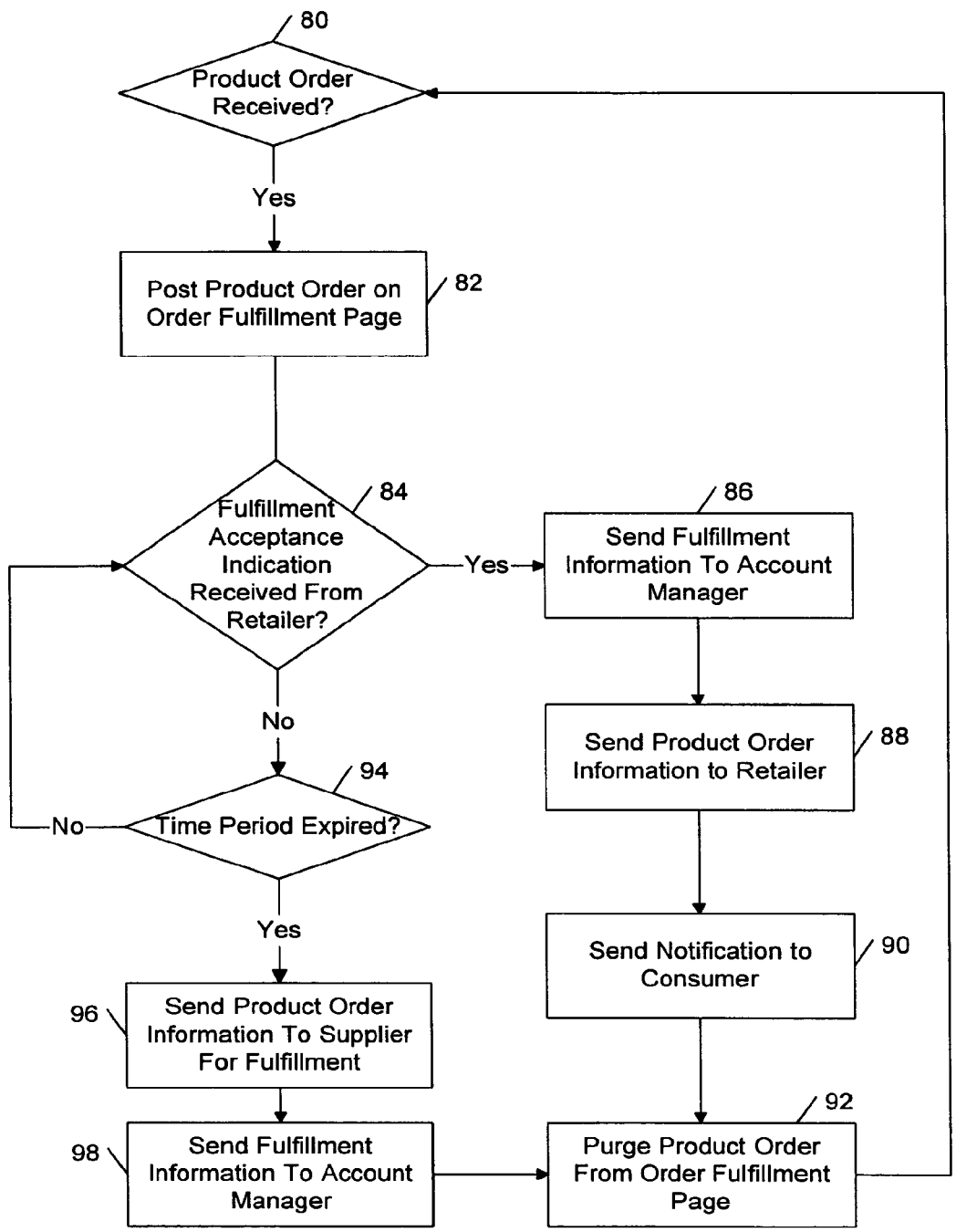
FIG. 4 is a flow diagram of a method of coordinating the distribution of a product from a supplier to a consumer.

Referring to FIG. 4, in one embodiment, product distribution coordinator 18 choreographs the fulfillment of a product order in accordance with a particular manufacturer's order fulfillment policy as follows. If a product order has been received (step 80), order flow controller 28 routes the order to back room manager 30 which posts the product order on an order fulfillment page accessible by retailers 22 (step 82). If a retailer transmits an indication that it will ship the order (step 84), back room manager transmits the fulfillment information to escrow account manager 26 (step 86), transmits the product order information (e.g., customer name) to the shipping retailer (step 88), transmits to the ordering consumer a notification that the order is being shipped (step 90), and removes the product order from the order fulfillment page (step 92). If the product has not been picked up by a participating retailer 22 within a preselected period of time (e.g., 24 hours) (step 94), back room manager 30 transmits the product order information to the manufacturer for fulfillment (step 96), transmits the fulfillment information to escrow account manager 26 (step 98), and removes the product order from the order fulfillment page (step 92).

Communications (e.g., notification and confirmation messages) that are transmitted to and from product distribution coordinator 18 preferably are transmitted electronically over the network (e.g., e-mail).

As explained above, when a consumer places an order, escrow account manager 26 retains the funds debited from the consumers credit card account in an escrow account for an escrow period (e.g., 30 days). After the escrow period has expired, escrow account manager 26 disburses a portion of the retained funds to the shipper (including the shipping cost that was charged to the customer), pays a fee to the credit card company and retains a portion of the funds as a transaction fee. In cases where a supplier picks up an order for fulfillment, the supplier may instruct escrow account manager 26 to share a portion of the shipment funds with one or more designated retailers (e.g., local retailers).

Product returns are routed to the entity (manufacturer or retailer) that shipped the product. If the escrow period has not expired, escrow account manager 26 returns funds to the consumer from the escrow account; otherwise, the shipper's escrow account is debited for the return. Warranty returns are routed to the shipper for standard processing.

Other embodiments are within the scope of the claims.

What is claimed is:

1. A method for coordinating the distribution of products from a plurality of product manufacturers to consumers from a network comprising a server comprising a display of an order fulfillment page wherein each of said product manufacturers is an entity having at least one distribution channel that involves a retail establishment, comprising:

posting to a plurality of manufacturers a second product order on an order fulfillment page on the network corresponding to a first product order received from a consumer on said network to a given manufacturer for a product of said given manufacturer, said order fulfillment page being accessible by said given manufacturer or by one or more product retailers identified by said manufacturer in accordance with the selected fulfillment policies on said network of said given manufacturer, wherein said first product order contains product order information of said consumer and said fulfillment polices are selected from:
  i) not accepting a consumer product order by any retailer or by said given manufacturer whereby product unavailability is indicated on said network;
  ii) fulfilling a consumer product order by said given manufacturer whereby the consumer product order is routed on the network to said given manufacturer for fulfillment;
  iii) fulfilling a consumer product order by a particular retailer identified by said given manufacturer based on the particular product ordered whereby the consumer product order is routed on the network to the identified retailer for fulfillment; and
  iv) fulfilling a consumer product order by routing the consumer product order to a product order list accessible by said given manufacturer, accessible by one or more retailers identified by said given manufacturer for fulfillment by any of said retailers or by said given manufacturer, or accessible by said given manufacturer and by one or more of said identified retailers whereby the consumer product order is routed on said network to a back room manager that posts the consumer product order on the product order list from which manufacturers and retailers select an order to be fulfilled by that manufacturer or retailer with a fulfillment acceptance indication;

whereby upon receipt of a fulfillment acceptance indication of said second product order from said given manufacturer or retailer said product order information is transmitted on said network to said given manufacturer or retailer; and said second product order is purged from said order fulfillment page after receiving said fulfillment acceptance indication on said network.

2. A method for coordinating the distribution of products from a product manufacturer to consumers from a network comprising a server comprising a display of an order fulfillment page wherein said product manufacturer is an entity having at least one distribution channel that involves a retail establishment, comprising:

posting a second product order on an order fulfillment page on the network corresponding to a first product order received from a consumer on said network to said manufacturer for a product of said manufacturer, said order fulfillment page being accessible by said manufacturer or by one or more product retailers identified by said manufacturer in accordance with the selected fulfillment policies on said network of said manufacturer, wherein said first product order contains product order information of said consumer and said fulfillment polices are selected from:
  i) not accepting a consumer product order by any retailer or by said manufacturer whereby product unavailability is indicated on said network;
  ii) fulfilling a consumer product order by said manufacturer whereby the consumer product order is routed on the network to said manufacturer for fulfillment;
  iii) fulfilling a consumer product order by a particular retailer identified by said manufacturer based on the particular product ordered whereby the consumer product order is routed on the network to the identified retailer for fulfillment; and
  iv) fulfilling a consumer product order by routing the consumer product order to a product order list accessible by said manufacturer, or accessible by one or more retailers identified by said manufacturer for fulfillment by any of said retailers or by said manufacturer, or accessible by said manufacturer and by one or more of said identified retailers whereby the consumer product order is routed on said network to a back room manager that posts the consumer product order on the product order list from which manufacturers and retailers select an order to be fulfilled by that manufacturer or retailer with a fulfillment acceptance indication;

whereby upon receipt of a fulfillment acceptance indication of said second product order from said manufacturer or retailer said product order information is transmitted on said network to said manufacturer or retailer; and said second product order is purged from said order fulfillment page after receiving said fulfillment acceptance indication on said network.

3. The method of claim 1 or 2, further comprising, if after a selected period of time after said second product order remains posted on said network without receiving a fulfillment acceptance indication, the step of transmitting said product information on said network to said manufacturer and purging said second product order on said network from said order fulfillment page.

4. The method of claim 1 or 2 wherein said first and second product order contain said product order information.

5. The method of claim 1 or 2 wherein said second product order contains less information than that contained in said first product order.

6. The method of claim 3 wherein said first and second product order contain said product order information.

7. The method of claim 3 wherein said second product order contains less information than that contained in said first product order.

* * * * *